(12) United States Patent
Mercuri

(10) Patent No.: US 12,409,804 B1
(45) Date of Patent: Sep. 9, 2025

(54) STOWABLE BELT BUCKLE

(71) Applicant: GM GLOBAL TECHNOLOGY OPERATIONS LLC, Detroit, MI (US)

(72) Inventor: Fernando Mercuri, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/812,222

(22) Filed: Aug. 22, 2024

(51) Int. Cl.
*B60R 22/20* (2006.01)
*B60R 22/18* (2006.01)

(52) U.S. Cl.
CPC ...... *B60R 22/20* (2013.01); *B60R 2022/1806* (2013.01)

(58) Field of Classification Search
CPC . B60R 22/20; B60R 2022/1806; B60R 22/26; B60R 22/341; B60R 22/4676; B60R 22/00; A44B 11/00
See application file for complete search history.

(56) References Cited

FOREIGN PATENT DOCUMENTS

| DE | 102005027115 A1 | 12/2006 |
|----|-----------------|---------|
| DE | 102018131555 A1 | 6/2020 |
| JP | H08207704 A * | 8/1996 |
| JP | 2010137641 A * | 6/2010 |
| JP | 6169476 B2 * | 7/2017 |

OTHER PUBLICATIONS

Matsumoto, JP-6169476-B2, Machine Translation of Specification (Year: 2017).*
Yamashita, JP-H08207704-A, Machine Translation of Specification (Year: 1996).*
Shingu, JP-2010137641-A, Machine Translation of Specification (Year: 2010).*
German Office Action for German Application No. 102024129561.9; dated Jun. 27, 2025; 4 pages.

* cited by examiner

*Primary Examiner* — Timothy Wilhelm
*Assistant Examiner* — Matthew Joseph Ganci
(74) *Attorney, Agent, or Firm* — CANTOR COLBURN LLP

(57) ABSTRACT

A device for engaging a seat belt in a vehicle includes a buckle configured to engage the seat belt, and a base fixedly disposed relative to a seat in the vehicle, where the buckle is moveable relative to the base between a stowed position and an engagement position. The device also includes a latch mechanism including a latch member, and a receiving component fixedly positioned relative to the base. The latch member is configured to be retained in the receiving component when the buckle is manually pushed into the stowed position, and the latch member is configured to be automatically released by manually pushing the buckle when the buckle is in the stowed position.

20 Claims, 5 Drawing Sheets

STOWABLE BELT BUCKLE

INTRODUCTION

The subject disclosure relates to vehicles, and more particularly, to restraint devices in vehicles.

Many passenger vehicles, particularly those manufactured after 1968, are equipped with passenger restraint systems. Modern vehicles typically feature front restraints that include both lap and shoulder belts. Rear passenger restraints are typically equipped with lap belts, and often include shoulder belts.

SUMMARY

In one exemplary embodiment, a device for engaging a seat belt in a vehicle includes a buckle configured to engage the seat belt, and a base fixedly disposed relative to a seat in the vehicle, where the buckle is moveable relative to the base between a stowed position and an engagement position. The device also includes a latch mechanism including a latch member, and a receiving component fixedly positioned relative to the base. The latch member is configured to be retained in the receiving component when the buckle is manually pushed into the stowed position, and the latch member is configured to be automatically released by manually pushing the buckle when the buckle is in the stowed position.

In addition to one or more of the features described herein, the seat belt is a rear seat belt in a rear occupant compartment of the vehicle.

In addition to one or more of the features described herein, the latch mechanism is selected from a grab latch mechanism and a push-push mechanism.

In addition to one or more of the features described herein, the device is disposed at a recess in the seat, and at least part of the buckle is configured to be located above the recess when the buckle is in the engagement position.

In addition to one or more of the features described herein, the buckle is configured to be entirely located within the recess when the buckle is in the stowed position.

In addition to one or more of the features described herein, the device includes a biasing mechanism configured to bias the buckle toward the engagement position.

In addition to one or more of the features described herein, the buckle is attached to the base by a pivot pin, and the buckle is rotatable about the pivot pin between the engagement position and the stowed position.

In addition to one or more of the features described herein, the buckle defines a first angle relative to the base when in the stowed position, and the buckle defines a second angle relative to the base when in the engagement position, the first angle being less than the second angle.

In another exemplary embodiment, a method of engaging and disengaging a seat belt in a vehicle includes manually applying a force to a buckle of a buckle assembly, the buckle connected to a base fixedly disposed relative to a seat in the vehicle, where the buckle is moveable relative to the base between a stowed position and an engagement position, the buckle assembly including a latch mechanism having a latch member and a receiving component fixedly positioned relative to the base. Manually applying the force includes pushing the buckle to cause the buckle to move from the engagement position to the stowed position, where the latch member is automatically retained in the receiving component when the buckle reaches the stowed position, and/or pushing the buckle when the buckle is in the stowed position to cause the latch member to be automatically released from the receiving component.

In addition to one or more of the features described herein, the buckle is caused to be returned to the engagement position when the latch member is released from the receiving component.

In addition to one or more of the features described herein, the buckle assembly includes a biasing mechanism configured to bias the buckle toward the engagement position.

In addition to one or more of the features described herein, the seat belt is a rear seat belt in a rear occupant compartment of the vehicle.

In addition to one or more of the features described herein, the buckle is attached to the base by a pivot pin, and the buckle is rotatable about the pivot pin between the engagement position and the stowed position.

In addition to one or more of the features described herein, the buckle defines a first angle relative to the base when in the stowed position, and the buckle defines a second angle relative to the base when in the engagement position, the first angle being less than the second angle.

In addition to one or more of the features described herein, the buckle assembly is disposed at a recess in the seat, and at least part of the buckle is configured to be located above the recess when the buckle is in the engagement position.

In addition to one or more of the features described herein, the buckle is configured to be entirely located within the recess when the buckle is in the stowed position.

In yet another exemplary embodiment, a vehicle system includes a buckle assembly disposed proximate to a rear seat belt in a rear occupant compartment of a vehicle. The buckle assembly includes a buckle configured to engage the rear seat belt, and a base fixedly disposed relative to the rear seat in the vehicle, where the buckle is moveable relative to the base between a stowed position and an engagement position. The buckle assembly also includes a latch mechanism including a latch member and a receiving component fixedly position relative to the base, where the latch member is configured to be retained in the receiving component when the buckle is manually pushed into the stowed position. The latch member is configured to be automatically released by manually pushing the buckle when the buckle is in the stowed position, and the buckle is caused to automatically return to the engagement position when the latch member is released from the receiving component.

In addition to one or more of the features described herein, the buckle assembly is disposed at a recess in the rear seat, at least part of the buckle is configured to be located above the recess when the buckle is in the engagement position.

In addition to one or more of the features described herein, an entirety of the buckle is located within the recess when the buckle is in the stowed position.

In addition to one or more of the features described herein, the buckle is attached to the base by a pivot pin and includes a biasing member configured to bias the buckle toward the engagement position, the buckle is rotatable about the pivot pin between the engagement position and the stowed position, the buckle defines a first angle relative to the base when in the stowed position, and the buckle defines a second angle relative to the base when in the engagement position, the first angle being less than the second angle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
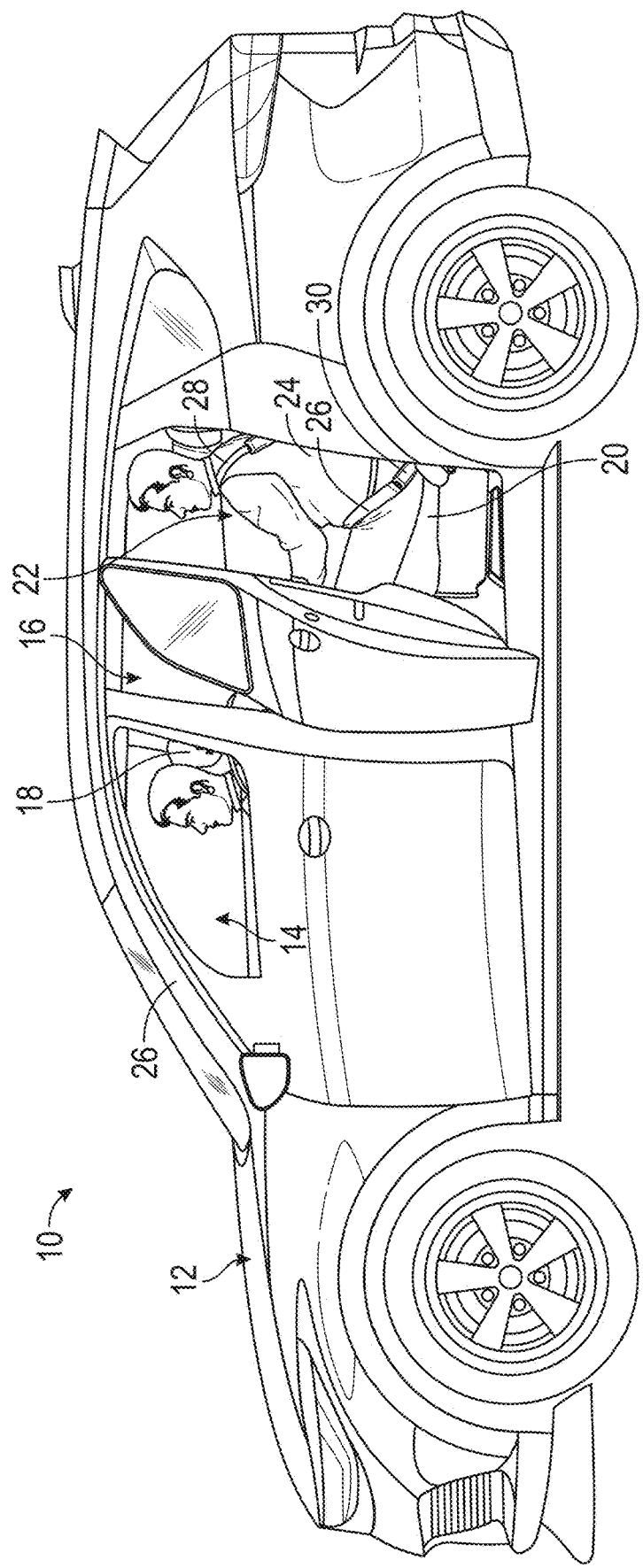
FIG. 1 is a side view of a vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for restraining a passenger in a vehicle. An embodiment of a passenger restraint system includes a buckle assembly having a buckle and a bracket configured to allow for manually stowing the buckle assembly in a stowed position, and manually releasing the buckle assembly to cause the buckle assembly to automatically return or move to an engagement position (in which the buckle assembly can be engaged with a seat belt).

The bracket includes a base attached to a location below a surface of the seat, and a manual stow and release mechanism (latch mechanism). The manual stow and release mechanism is configured to allow a passenger or user to push (or otherwise apply a force to) the buckle to the stowed position and automatically retain the buckle in the stowed position. The mechanism also allows the user to apply a force to the buckle when the buckle is in the stowed position, which automatically releases the buckle and permits the buckle to return to the engagement position.

Embodiments described herein present numerous advantages and technical effects. The embodiments provide a simple and effective mechanism for stowing and positioning a seat belt buckle. Current seat belt buckles are placed above a seat cushion surface for ease of use; however, this can cause the buckle to be susceptible to damage (e.g., by cargo being placed in the seat) or cause occupant discomfort when moving across the rear seat. Embodiments address this limitation by allowing buckles to be stowed by a user (e.g., into a pocket in a seat cushion) when not in use, while still being able to self-present at the ideal position for buckling a seat belt when desired by the user (e.g. by the user simply pushing the buckle).

The embodiments described herein are not limited to use with any specific vehicle, device or system, and may be applicable to various devices and systems. For example, embodiments may be used with automobiles, trucks, construction equipment, farm equipment, and/or any other vehicle or machine that includes seat restraints.

FIG. 1 shows a portion of an embodiment of a motor vehicle 10, which may be a combustion engine vehicle, an electrically powered vehicle (EV) or a hybrid vehicle. The vehicle 10 includes a vehicle body 12 defining, at least in part, a front occupant compartment 14 and a rear occupant compartment 16. The front occupant compartment includes one or more seats 18, and the rear occupant compartment includes one or more seats 20.

The vehicle 10 includes a passenger restraint system 22 configured to be worn by a passenger 24. The passenger restraint system 22 includes a lap belt 26 and may also include a shoulder belt 28. The passenger restraint system 22 also includes a buckle assembly 30.

Figure 2:
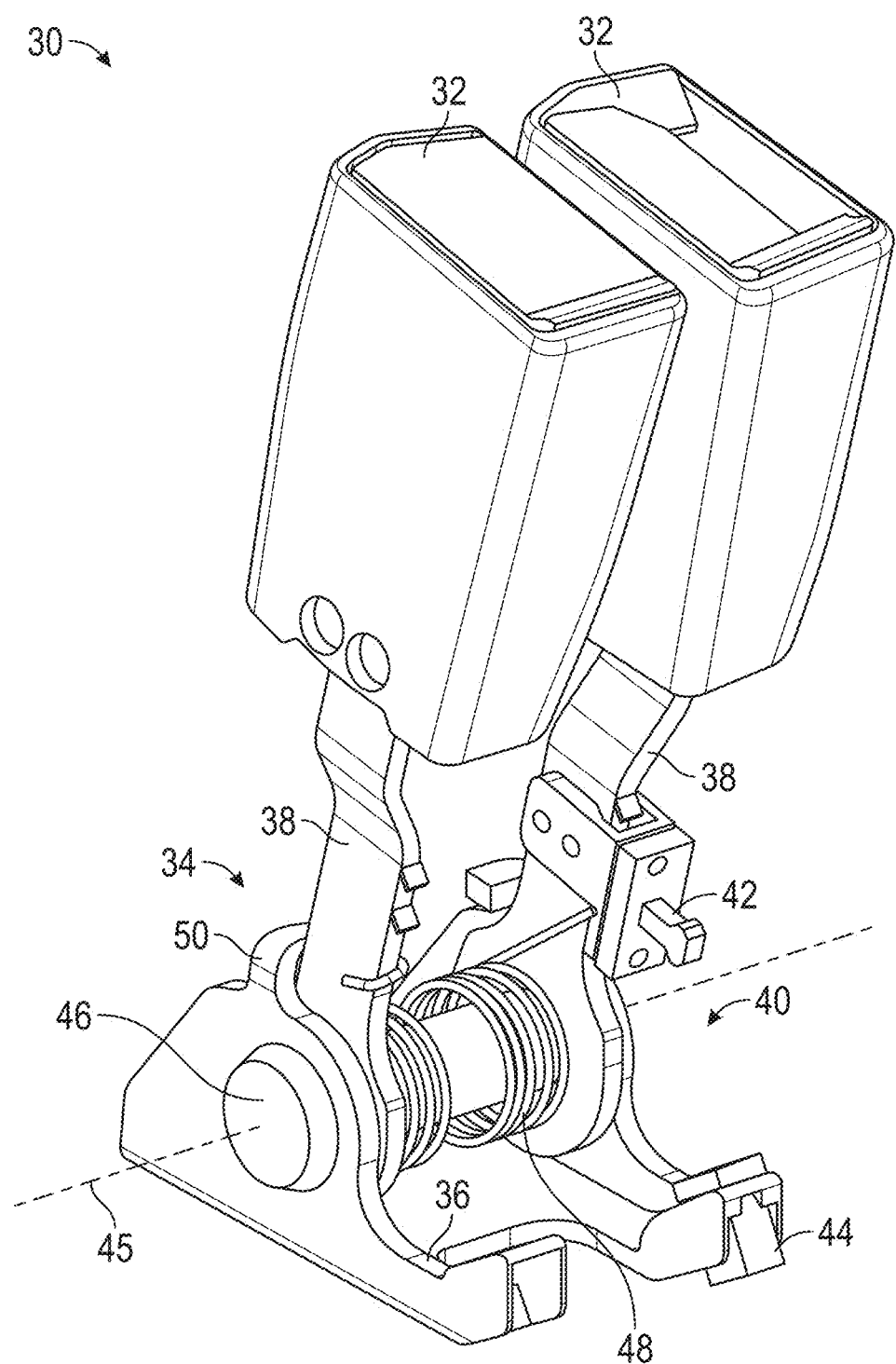
FIG. 2 is a perspective view of a buckle assembly, in accordance with an exemplary embodiment.

FIG. 2 depicts an embodiment of the buckle assembly 30. The buckle assembly 30 is discussed in conjunction with the vehicle 10 and the rear seat 20 for illustration purposes. However, the buckle assembly 30 is not limited to use with the vehicle 10 or similar vehicles.

The buckle assembly 30 includes at least one buckle 32 attached to a bracket 34. The bracket 34 includes a base 36 designed to be attached or fixedly disposed proximate to a seat, such as the rear seat 20. The buckle 32 is connected to the base 36 by a rigid connection member 38.

The buckle assembly 30 is shown in FIG. 2 as including multiple buckles 32, each of which is connected to the base via a respective connection member 38. This configuration may be used so as to accommodate adjacent restraints. Alternatively, the buckle assembly 30 may include a single buckle 32. Also, as shown in FIG. 2, only one latch mechanism 40 (discussed further herein) may be needed, although more than one latch mechanism 40 may be included (e.g., if the buckles are intended to ne independently moveable).

Although the buckle assembly 30 is shown as being in the rear occupant compartment 16, embodiments are not so limited. For example, the buckle assembly 30 may be part of a front seat 18 and/or other seats or seating arrangements, such as multiple rear seat rows, foldable seats and others.

The buckle assembly 30 is moveable between an engagement position and a stowed position. An "engagement position" is any position or orientation of the buckle 32 that allows the buckle 32 to engage a seat belt. For example, the engagement position is an upright position, which may be a vertical position or an angled position.

A "stowed position" is any position or orientation of the buckle 32 where the buckle 32 is positioned so as not to interfere with use of a seat. For example, a stowed position is a position where the buckle 32 is below a surface of the seat 20 or in a recess.

The bracket 34 also includes the latch mechanism 40, which includes a latch member or actuator member 42. The latch member 42 is configured to engage a receptacle or receiving component 44. For example, as shown in FIG. 2, the latch member 42 is a strike member having a rounded end (or other shape), and the receiving component 44 is a grab latch. The latch member 42 may be attached to the connection member 38 and the receiving component 44 may be attached to the base 36 as shown, or vice versa (i.e., the latch member 42 may be attached to the base 36, with the receiving component 44 attached to the connection member 38).

In use, when the buckle 32 is in the engagement position, and the buckle 32 is pushed (e.g., rotated downwardly), the latch member 42 engages a grab latch 44 (or is otherwise positioned in the receiving component 44), and the latch member 42 is retained within the receiving component 44 (e.g., by the grab latch 44) and the buckle 32 is held in the stowed position. When the buckle 32 is again pushed, the latch member 42 is released from the receiving component 44.

When the buckle 32 is released from the receiving component 44, the buckle 32 may be freely moveable (e.g., rotated) to allow the user to manually adjust the buckle's position. In an embodiment, the buckle 32, when engaged with a seat belt, will automatically adjust to a position that aligns with the seat belt.

The latch mechanism is not limited to any particular mechanism. The latch mechanism can be, for example, a cam latch, a push-to-close or slam latch, a push-push slide mechanism or other suitable mechanism or device.

In an embodiment, the buckle 32 is rotatable relative to the base 36, such that moving the buckle 32 causes the buckle to rotate about a fixed pivot axis 45. For example, as shown in FIG. 2, the connection member(s) 38 is/are connected to a pivot pin 46 retained at the base 36.

In an embodiment, the buckle assembly 30 includes a biasing mechanism, such as a spring 48, which is configured to bias the buckle 32 toward the engagement position. The biasing mechanism causes the buckle 32 to automatically return to a desired engagement position upon release of the latch member 42 from the receiving component 44.

The biasing mechanism may include any suitable type of spring (e.g., coil spring, leaf spring, etc.) or biasing member. For example, as shown in FIG. 2, the buckle assembly 30 includes a spring 48 coiled around the pivot pin 46, which causes the buckle 32 to be automatically returned to the engagement position when a user pushes the buckle 32 causing the buckle 32 to disengage from the receiving component 44. A mechanical stop 50 may be included to restrict the rotational motion of the buckle 32 and establish the engagement position.

FIGS. 3A-3B and 4A-4B show an example of the buckle assembly 30 as positioned proximate to the rear seat 20. The rear seat 20 includes a recess 52. The buckle assembly 30 is disposed in the recess 52, where the base 36 is attached to the structure of the vehicle 10 and fixed with respect to the seat 20.

The buckle 32 in this example is movable between the engagement position and the stowed position by rotation about the pivot pin 46. The positions of the buckle 32 are defined in this example, by an angle with respect to a vertical direction V and a horizontal direction H. Movement of the buckle 32 is not limited to rotation, as the buckle can be moved in other ways, such as linearly (e.g., by sliding or otherwise moving along a straight direction).

Figure 3B:
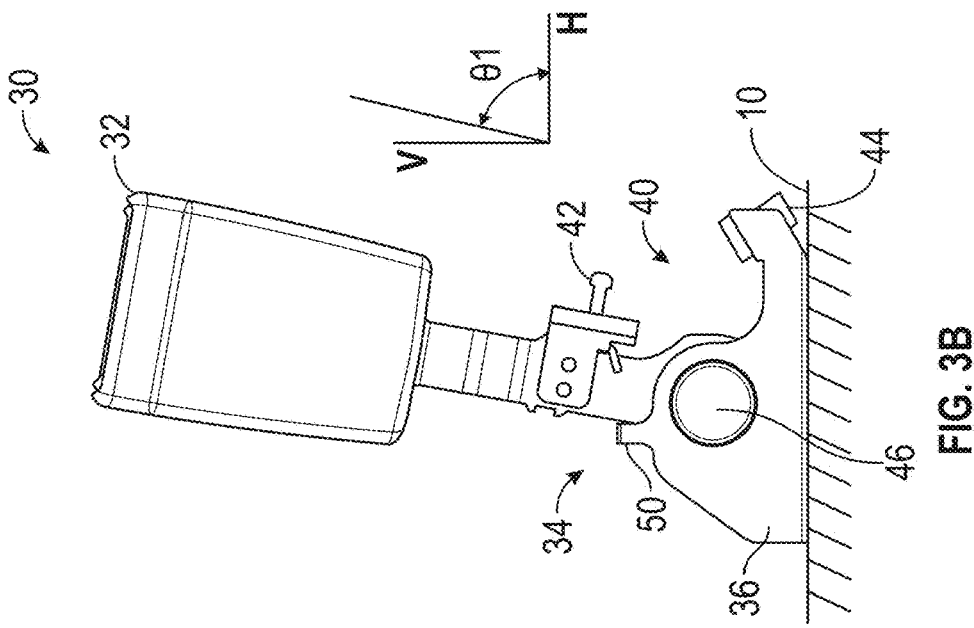
FIG. 3B depicts a side view of the buckle assembly in the engagement position, in accordance with an exemplary embodiment.
Figure 3A:
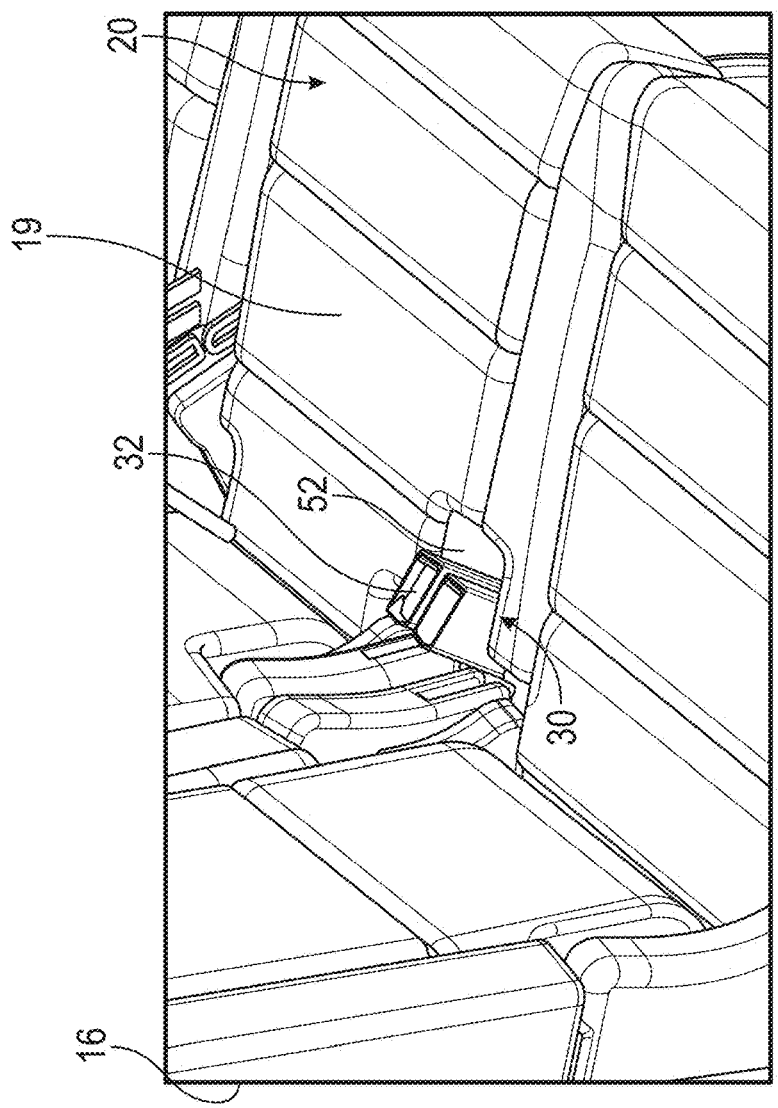
FIG. 3A depicts a portion of a vehicle seat and a buckle assembly in an engagement position.

FIG. 3A shows a portion of the rear compartment 16 of the vehicle 10, and the buckle assembly 30 in the engagement position. FIG. 3B is a side view of the buckle assembly 30 in the engagement position.

As shown in FIG. 3A, when the buckle assembly 30 is in the engagement position, the buckle 32 is positioned so that at least a portion of the buckle 32 is above a seat surface 19 and can be easily connected to a seat belt. In this example, as shown in FIG. 3B, the buckle assembly 30 defines a first angle θ1 (e.g., 70-80 degrees), however it is to be understood that the first angle may be any suitable angle (including vertical or 90 degrees).

Figures 4A, 4B:
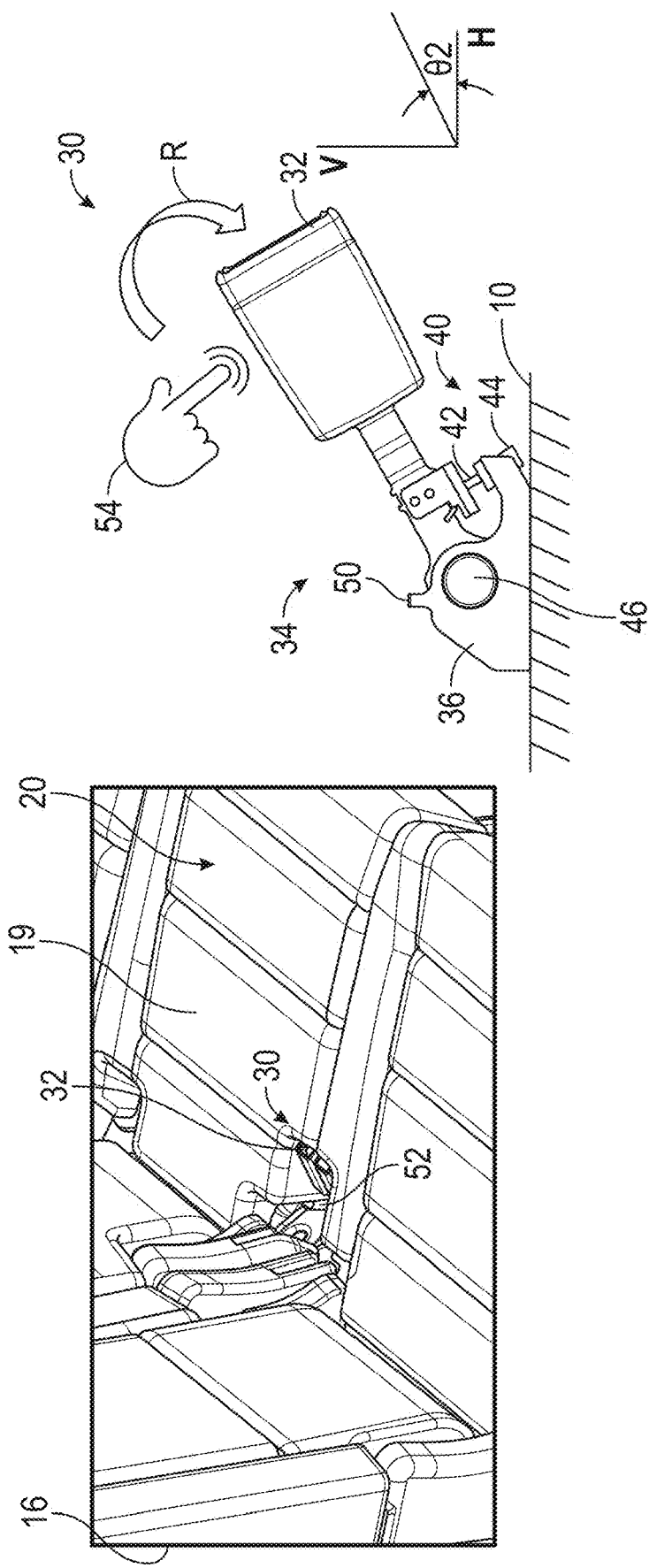
FIG. 4A depicts a portion of a vehicle seat and a buckle assembly in a stowed position.
FIG. 4B depicts a side view of the buckle assembly in the stowed position, in accordance with an exemplary embodiment.

FIG. 4A shows a portion of the rear compartment 16 of the vehicle 10, and the buckle assembly 30 in the stowed position. FIG. 4B is a side view of the buckle assembly 30 in the stowed position.

As shown in FIG. 4A, when the buckle assembly 30 is in the stowed position, the buckle assembly 30 is held at an angle such that the entire buckle 32 is below the surface 19 of the seat 20. For example, the buckle assembly 30 defines a second angle θ2 (e.g., 20-30 degrees), as shown in FIG. 4B. The angle θ2 may be any suitable angle (including horizontal or zero degrees). As also shown in FIG. 4B, a user 54 may manually push the buckle 32 to cause the buckle 32 to rotate (as represented by arrow R) into the receiving component 44, and thereby retain or "click" the buckle 32 in place in the stowed position. When the user 54 wishes to use the seat belt 26 and/or shoulder belt 28, another "click" or push on the buckle 32 releases the buckle 32 and the buckle assembly automatically returns to the engagement position.

FIGS. 5A, 5B, 5C and 6 depict an embodiment of the buckle assembly 30, in which the bracket 34 includes a push-push mechanism 60. The buckle assembly 30 is discussed in conjunction with the vehicle 10 and the rear seat 20 for illustration purposes. However, the buckle assembly 30 is not limited to use with the vehicle 10 or similar vehicles.

The push-push mechanism 60 includes an articulated latch member 62 that is attached to the connection member 38, and includes a guide component 64 at an end of the latch member 62. The guide component 64 is disposed in a guide track 66 of a receiving component 68 that is attached to or otherwise fixedly positioned relative to the base 36.

The guide track 66 forms a loop along which the guide component 64 can travel. The guide track 66 includes a rounded end 70 and a notch portion 72. The notch portion 72 functions to retain the guide component 64 at a fixed location and thereby keep the connection member 38 at a fixed position. Pushing the connection member 38 or the buckle 32 causes the guide component 64 to move away from the notch portion 72 and allows the connection member 38 to transition between the stowed position and the engagement position.

Figure 5A:
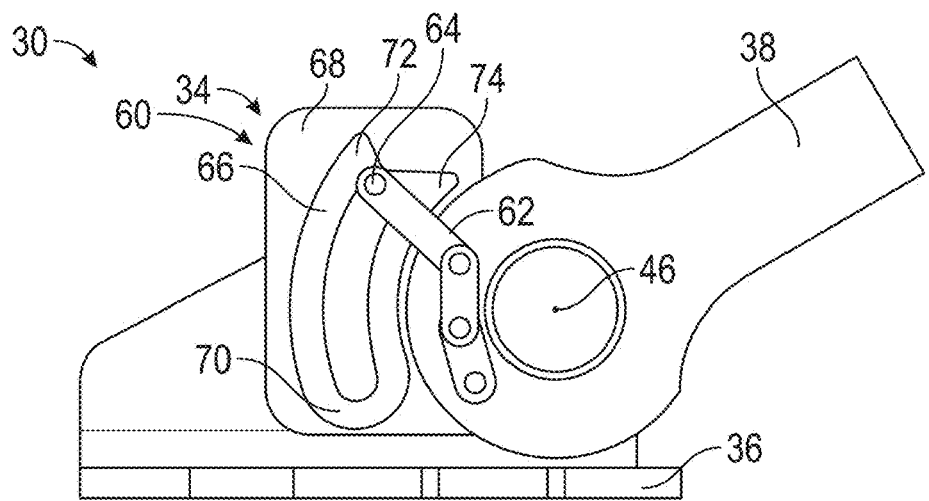
FIG. 5A depicts a side view of a buckle assembly in a stowed position.

FIG. 5A shows the buckle assembly 30 in the stowed position, in which the guide component 64 is retained in the notch portion 72. A biasing member such as a spring (not shown), biases the connection member 38 toward the engagement position.

Figure 5B:
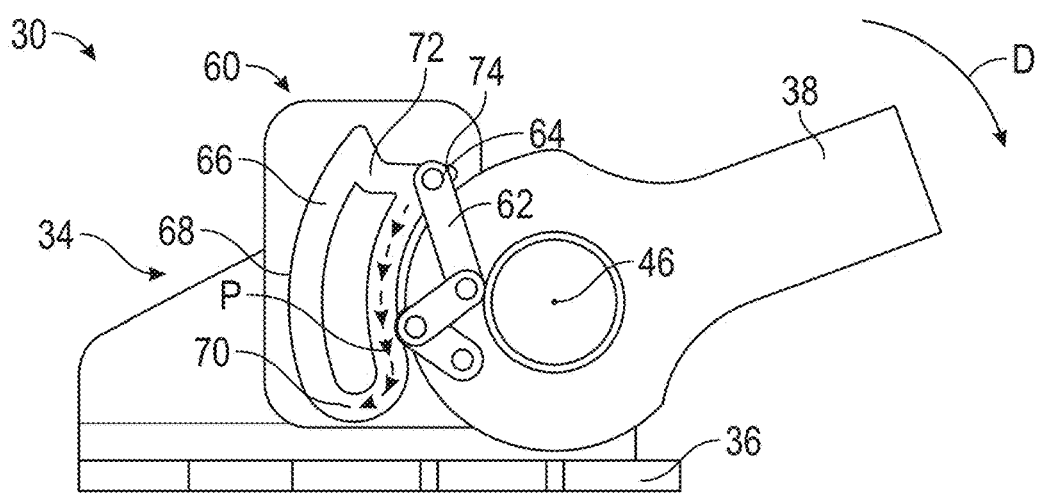
FIG. 5B depicts a side view of the buckle assembly during transition to an engagement position.

To transition to the engagement position, a user applies a force by pushing down so that the connection member 38 and the buckle 32 rotate in the direction shown by arrow D, as shown FIG. 5B. Pushing causes the guide component 64 to move toward an apex 74 of the guide track 66.

Figure 5C:
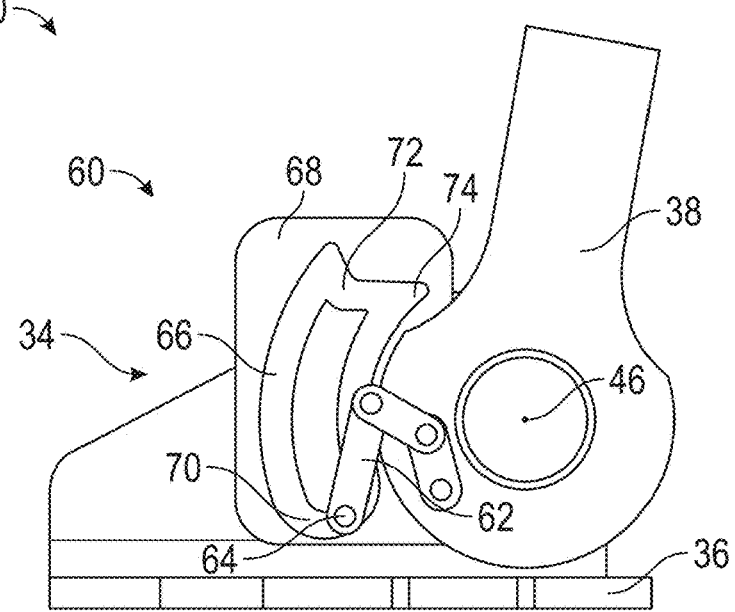
FIG. 5C depicts a side view of the buckle assembly in the engagement position, in accordance with an exemplary embodiment.

The user subsequently releases the force, and the biasing member causes the connection member 38 to move toward the engagement position, and the guide component 64 moves along path P toward the rounded end 70. When the connection member 38 reaches the engagement position, the guide component 64 is located at the rounded end 70, as shown in FIG. 5C. The connection member 38 and the buckle 32 are held in the engagement position by the biasing member. The user can push the buckle 32 again to put the buckle in the stowed position.

Embodiments described herein can be used with preexisting seatbelt buckles with minimal re-design of the buckle brackets. The embodiments can be also used as an optional or luxury feature for high end vehicles to improve the appearance of rear row seats.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A device for engaging a seat belt in a vehicle, comprising:
    a buckle configured to engage the seat belt;
    a base fixedly disposed relative to a seat in the vehicle, wherein the buckle is moveable relative to the base between a stowed position and an engagement position;
    a biasing mechanism configured to apply a biasing force to the buckle, the biasing force urging the buckle toward the engagement position; and
    a latch mechanism including a latch member, and a receiving component fixedly positioned relative to the base, wherein the latch member is configured to be retained in the receiving component when the buckle is manually pushed in a first direction into the stowed position, and the latch member is configured to be automatically released from the receiving component by manually pushing the buckle in the first direction when the buckle is in the stowed position, the biasing force causing the buckle to automatically return to the engagement position upon release of the buckle, wherein the latch mechanism includes a grab latch mechanism, the grab latch mechanism including a strike member and a grab latch, the grab latch configured to retain the strike member when the buckle is in the stowed position, and release the strike member and the buckle from the stowed position when the buckle is pushed in the first direction.

2. The device of claim 1, wherein the seat belt is a rear seat belt in a rear occupant compartment of the vehicle.

3. The device of claim 1, wherein the latch mechanism includes a mechanical stop configured to restrict a motion of the buckle and establish the engagement position.

4. The device of claim 1, wherein the device is disposed at a recess in the seat, and at least part of the buckle is configured to be located above the recess when the buckle is in the engagement position.

5. The device of claim 4, wherein the buckle is configured to be entirely located within the recess when the buckle is in the stowed position.

6. The device of claim 1, wherein the latch mechanism is a push-push mechanism, the push-push mechanism includes an articulated member, the receiving component includes a guide track configured to receive an end of the articulated member, and manually pushing the buckle causes the end to move along the guide track and allow the buckle to automatically return to the engagement position.

7. The device of claim 1, wherein the buckle is attached to the base by a pivot pin, and the buckle is rotatable about the pivot pin between the engagement position and the stowed position.

8. The device of claim 7, wherein the buckle defines a first angle relative to the base when in the stowed position, and the buckle defines a second angle relative to the base when in the engagement position, the first angle being less than the second angle.

9. A method of engaging and disengaging a seat belt in a vehicle, comprising:
    manually applying a force to a buckle of a buckle assembly, the buckle connected to a base fixedly disposed relative to a seat in the vehicle, wherein the buckle is moveable relative to the base between a stowed position and an engagement position, the buckle assembly including a latch mechanism having a latch member and a receiving component fixedly positioned relative to the base, the buckle assembly including a biasing mechanism configured to apply a biasing force to the buckle, the biasing force urging the buckle toward the engagement position, wherein the latch mechanism includes a grab latch mechanism, the grab latch mechanism including a strike member and a grab latch, the grab latch configured to retain the strike member when the buckle is in the stowed position, and release the strike member and the buckle from the stowed position when the buckle is pushed in the first direction, and wherein manually applying the force includes at least one of:
        pushing the buckle in a first direction to cause the buckle to move from the engagement position to the stowed position, wherein the latch member is automatically retained in the receiving component when the buckle reaches the stowed position; and
        pushing the buckle in the first direction when the buckle is in the stowed position to cause the latch member to be automatically released from the receiving component, the biasing force causing the buckle to automatically return to the engagement position upon release of the buckle.

10. The method of claim 9, wherein the latch mechanism includes a mechanical stop configured to restrict a motion of the buckle and establish the engagement position.

11. The method of claim 10, wherein the latch mechanism is a push-push mechanism, the push-push mechanism includes an articulated member, the receiving component includes a guide track configured to receive an end of the articulated member, and manually pushing the buckle causes the end to move along the guide track and allow the buckle to automatically return to the engagement position.

12. The method of claim 9, wherein the seat belt is a rear seat belt in a rear occupant compartment of the vehicle.

13. The method of claim 9, wherein the buckle is attached to the base by a pivot pin, and the buckle is rotatable about the pivot pin between the engagement position and the stowed position.

14. The method of claim 13, wherein the buckle defines a first angle relative to the base when in the stowed position, and the buckle defines a second angle relative to the base when in the engagement position, the first angle being less than the second angle.

15. The method of claim 9, wherein the buckle assembly is disposed at a recess in the seat, and at least part of the buckle is configured to be located above the recess when the buckle is in the engagement position.

16. The method of claim 15, wherein the buckle is configured to be entirely located within the recess when the buckle is in the stowed position.

17. A vehicle system comprising:
a buckle assembly disposed proximate to a rear seat belt in a rear occupant compartment of a vehicle, the buckle assembly including:
a buckle configured to engage the rear seat belt;
a base fixedly disposed relative to the rear seat in the vehicle, wherein the buckle is moveable relative to the base between a stowed position and an engagement position;
a biasing mechanism configured to apply a biasing force to the buckle, the biasing force urging the buckle toward the engagement position; and
a latch mechanism including a latch member and a receiving component fixedly position relative to the base, wherein the latch member is configured to be retained in the receiving component when the buckle is manually pushed in a first direction into the stowed position, the latch member is configured to be automatically released from the receiving component by manually pushing the buckle in the first direction when the buckle is in the stowed position, and the buckle is caused by the biasing force to automatically return to the engagement position when the latch member is released from the receiving component, wherein the latch mechanism includes a grab latch mechanism, the grab latch mechanism including a strike member and a grab latch, the grab latch configured to retain the strike member when the buckle is in the stowed position, and release the strike member and the buckle from the stowed position when the buckle is pushed in the first direction.

18. The vehicle system of claim 17, wherein the buckle assembly is disposed at a recess in the rear seat, at least part of the buckle is configured to be located above the recess when the buckle is in the engagement position.

19. The vehicle system of claim 18, wherein an entirety of the buckle is located within the recess when the buckle is in the stowed position.

20. The vehicle system of claim 17, wherein the buckle is attached to the base by a pivot pin and includes a biasing member configured to bias the buckle toward the engagement position, the buckle is rotatable about the pivot pin between the engagement position and the stowed position, the buckle defines a first angle relative to the base when in the stowed position, and the buckle defines a second angle relative to the base when in the engagement position, the first angle being less than the second angle.

* * * * *